United States Patent [19]

Osawa

[11] Patent Number: 5,072,105

[45] Date of Patent: Dec. 10, 1991

[54] SOLAR RADIATION DETECTING DEVICE AND AUTOMOBILE AIR-CONDITIONER USING THE SAME

[75] Inventor: Takashi Osawa, Konan, Japan

[73] Assignee: Zexel Corporation, Tokyo, Japan

[21] Appl. No.: 587,804

[22] Filed: Sep. 25, 1990

[30] Foreign Application Priority Data

Sep. 29, 1989 [JP] Japan .................................. 1-114695

[51] Int. Cl.[5] .......................... G01J 1/42; G01J 40/14
[52] U.S. Cl. .................................. 250/206.1; 165/42; 454/75; 454/900
[58] Field of Search ............... 250/203.4, 206.1, 206.2, 250/208.2, 208.6; 98/2.01; 165/42; 236/916

[56] References Cited

U.S. PATENT DOCUMENTS

| | | | |
|---|---|---|---|
| 4,760,772 | 8/1988 | Horiquchi et al. .............. | 250/206.1 |
| 4,961,462 | 10/1990 | Iida et al. ......................... | 98/2.01 |
| 5,020,424 | 6/1991 | Iida et al. ......................... | 165/42 |

Primary Examiner—David C. Nelms
Assistant Examiner—John R. Lee
Attorney, Agent, or Firm—Wenderoth, Lind & Ponack

[57] ABSTRACT

A solar radiation detecting device for an automobile air-conditioner includes a left solar radiation sensor, a right solar radiation sensor and a horizontal solar radiation sensor for detecting quantities of the sunlight coming into the passenger compartment of an automobile so that an incident direction, an incident altitude and an incident intensity of the sunlight are calculated based on the detecting solar radiation quantities. The incident direction and altitude are used to vary the distribution air discharged from a vent outlet of the air-conditioner into the passenger compartment.

6 Claims, 6 Drawing Sheets

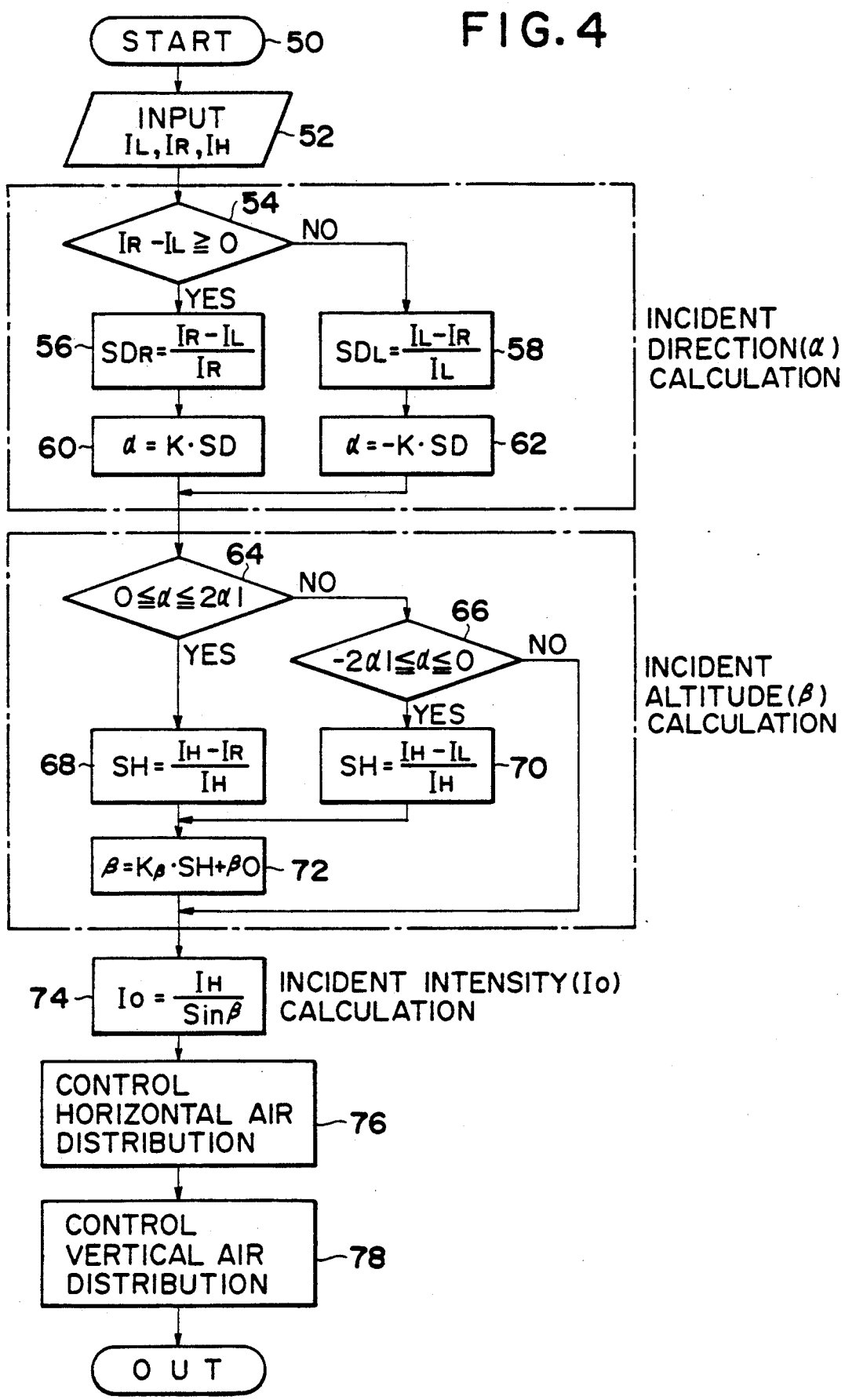

SOLAR RADIATION DETECTING DEVICE AND AUTOMOBILE AIR-CONDITIONER USING THE SAME

BACKGROUND OF THE INVENTION

1. Field of the Invention

The present invention relates to a solar radiation detecting device for detecting the sunlight coming into the passenger compartment of an automobile and an automobile air-conditioner using such solar radiation detecting means.

2. Description of the Prior Art

One known solar radiating condition detecting device is disclosed in Japanese Patent Laid-open Publication No. 62-73108, for example. The detecting device includes a base in the form of a truncated quadrilateral pyramid disposed on the upper surface of an instrument panel, and solar radiation sensors disposed on three or four sides, respectively, of the truncated quadrilateral pyramidal base for detecting the incident direction of the sunlight and other solar radiating conditions of the automobile based on outputs from the respective sensors.

With this mounting structure of the solar radiation sensors, the known detecting device is unable to perform a sufficient detection of the direction, altitude and intensity of the incident sunlight among other solar radiating conditions. This is because due to the directivity of the respective solar radiation sensors, the output from one solar radiation sensor can be compensated by another solar radiation sensor in terms of detection of the incident direction of the sunlight, however, such compensation of outputs is difficult to obtain when the incident altitude and the incident intensity of the sunlight are detected.

Furthermore, the position of the sunlight incident upon an occupant of the automobile via the instrument panel changes with the altitude of the sun. It is therefore desired that the solar radiating conditions are detected accurately and, based on the thus detected solar radiation conditions, the automobile air-conditioner is controlled to adjust the direction of discharged air appropriately.

SUMMARY OF THE INVENTION

With the foregoing difficulties in view, it is an object of the present invention to provide a solar radiation detecting device including a solar radiation sensors so arranged as to effectively detect the incident direction, incident altitude and incident intensity of the sunlight.

Another object of the present invention is to provide an automobile air conditioner incorporating such solar radiation detecting device and capable of adequately controlling the vertical distribution of discharged air blown off from a bent outlet depending upon the incident altitude which is detected by the solar radiating detecting device.

According to a first aspect of the present invention, there is provided a solar radiation detecting device for an automobile air-conditioner, comprising: first and second solar radiation sensors adapted to be disposed in the passenger compartment of an automobile and having respective sensing surfaces receiving the sunlight coming into the passenger compartment, the sensing surfaces extending obliquely both in a vertical direction and a horizontal direction relatively to an imaginary vertical plane extending in a direction of travel of an automobile; and a third solar radiation sensor adapted to be disposed in the passenger compartment and having a sensing surface receiving the sunlight coming into the passenger compartment, the sensing surface of the third solar radiation sensor extending substantially horizontally.

With this construction, the respective solar radiation sensors are arranged in such a positional relation to compensate their own directivities. The incident direction, incident altitude and incident intensity can always be detected accurately irrespective of the direction and altitude of the sunlight coming into the passenger compartment of the automobile.

According to a second aspect of the present invention, there is provided an air-conditioner for an automobile, comprising: an air-distribution adjusting mechanism disposed in a vent outlet of the automobile air-conditioner for adjustably varying the vertical distribution of discharged air blown off from the vent outlet into a passenger compartment of the automobile; a solar radiation detecting device including first and second solar radiation sensors disposed in the passenger compartment and having respective sensing surfaces for receiving the sunlight coming into the passenger compartment, the sensing surfaces extending obliquely both in a vertical direction and a horizontal direction relatively to an imaginary vertical plane extending in a direction of travel of an automobile, and a third solar radiation sensor disposed in the passenger compartment and having a sensing surface receiving the sunlight coming into the passenger compartment, the sensing surface of the third solar radiation sensor extending substantially horizontally; incident direction calculating means for calculating an incident direction of the sunlight based on outputs from the first and second solar radiation sensors; incident altitude calculating means for calculating an incident altitude of the sunlight based on an output from the third solar radiation sensor and an output from one of the first and second solar radiation sensors when the incident direction calculated by the incident direction calculating means is in a predetermined range; and drive control means for controlling operation of the air-distribution adjustment mechanism depending on the magnitude of the incident altitude calculated by the incident altitude calculating means.

With this construction, when the position of the sunlight impinging on an occupant via the instrument panel changes with the incident altitude, the vertical distribution of air discharged into the passenger compartment can be adjusted in such a manner as to direct the conditioned air reliably onto a sunlit portion of the occupant, based on the incident altitude which as been detected accurately by the solar radiation detecting device.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 4 is a flowchart showing a control routine achieved by a microcomputer incorporated in the automobile air-conditioner for controlling operation of the air-conditioner;

DETAILED DESCRIPTION

The present invention will be described hereinbelow in greater detail with reference to a certain preferred embodiment shown in the accompanying drawings.

Figure 2:
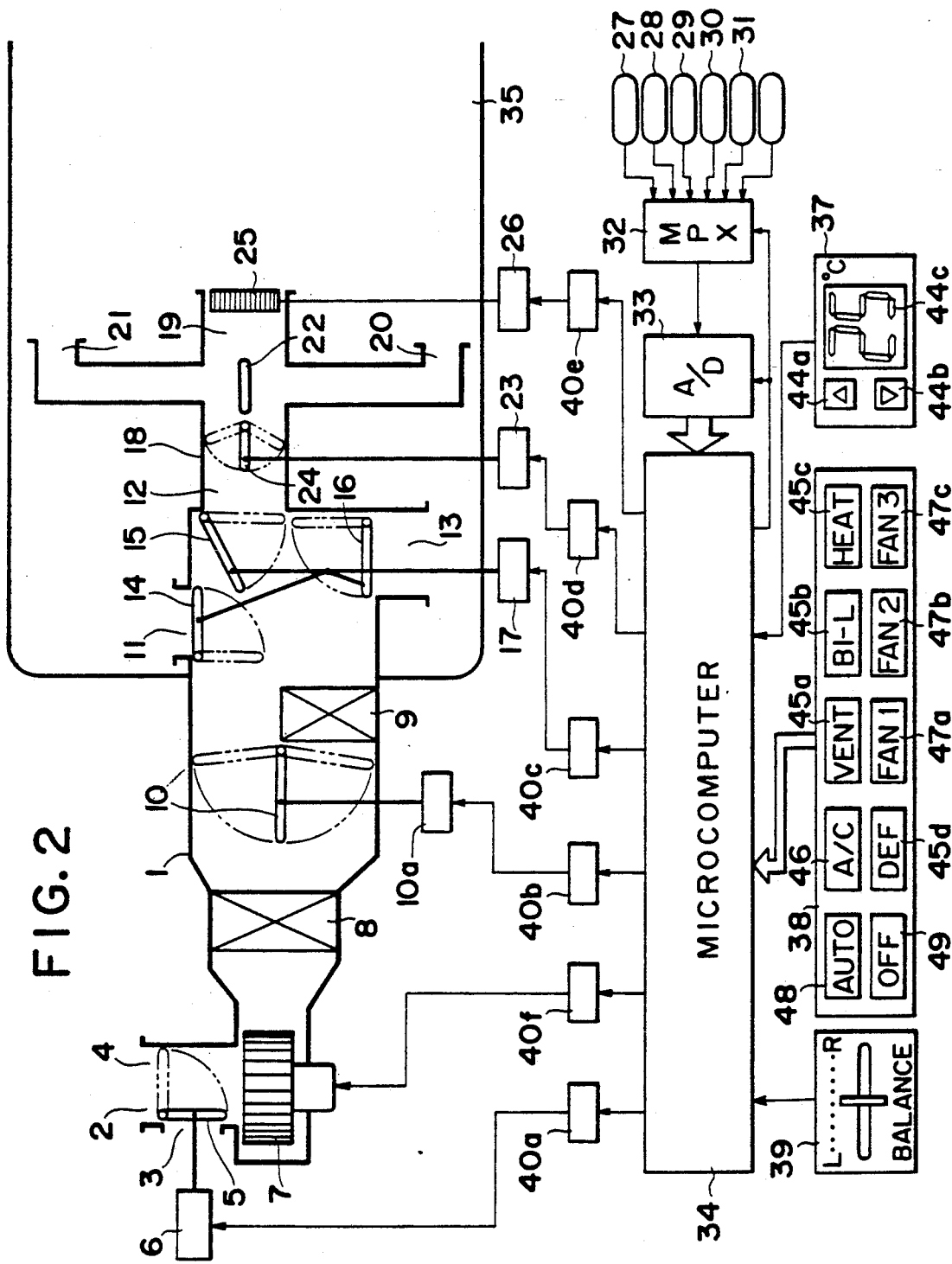
FIG. 2 is a diagrammatical view showing an automobile air-conditioner incorporating the solar radiation detecting device of the present invention.

FIG. 2 diagrammatically shows an automobile air-conditioner. The air-conditioner includes an air-flow duct 1 having a selector device 2 disposed on an upstream end of the air-flow duct 1. The selector device 2 includes a selector door 5 disposed at the junction between a recirculating air inlet 3 and an outside air inlet 4 which are provided in a bifurcated fashion. The selector door 5 is actuated by an actuator 6 to select the recirculated air or the outside air to be introduced into the air-flow duct 1, so that a desired intake mode is obtained.

A blower 7 is disposed in the air-flow duct 1 adjacent to the air inlets 3, 4 for forcing the air to flow downstream through the air-flow duct 1. The duct 1 also includes an evaporator 8 and a heater core 9 disposed downstream of the blower 7 in the order mentioned.

The evaporator 8 is connected by piping with a compressor and other components (none of them being shown) to jointly constitute a refrigeration system or cycle. The heater core 9 heats air passing therearound by subjecting air into heat exchange process between an engine cooling water circulating through the heater core 9. The air-flow duct 1 further contains air-mix door 10 disposed at an upstream side of the heater core 9. The angular position of the air-mix door 10, that is, the opening of the air-mix door 10 is regulated by an actuator 10a so that proportions of air flowing through the heater core 9 and air bypassing the heater core 9 are changed to thereby control the temperature of air to be discharged from the air-conditioner.

The air-flow duct 1 has at its downstream end a defroster outlet 11, a connecting vent outlet 12 and a heat outlet 13 what are provided in branched fashion. Three mode doors 14, 15, 16 are disposed adjacent to the respective outlets 11, 12, 13. The mode doors 14-16 are controlled by an actuator 17 to provide a desired discharge mode. The downstream end the connecting vent outlet 12 is connected to a vent duct 18. The bent duct 18 has at its downstream end a central air outlet 19, a left air outlet 20 and a right air outlet 21 that are provided in branched fashion and all open to a passenger compartment 35 of the automobile. A partition wall 22 is disposed at the junction between these air outlets 19-21, and an air-distribution door 24 is disposed in front of the partition wall 22. The air-distribution door 24 is controlled by an actuator 23 to adjust proportions of air distributed to a left portion of the passenger compartment 35 and air distributed to a right portion of the passenger compartment 35. The central air outlet 19 is provided with a grille 25 which is movable to change a range of vertical air distribution and the lower limit of such vertical air-distribution range, in particular. The range of movement of the grille 25 is changed by a motor actuator 26. The grille 25 and the actuator 26 constitute an air-distribution adjustment mechanism.

Designated by 27 is a passenger compartment temperature sensor for detecting the temperature in the passenger compartment 35, by 28 an outside air temperature sensor for detecting the temperature of the outside air, and 29 through 31 first to third solar radiation sensors for detecting solar radiating conditions. Output signals from the respective sensors 27-31 are inputted through a multiplexer 32 into an analog-to-digital (A/D) converter 33 in the order selected by the multiplexer 32. The A/D converter 33 digitizes the input signals and then send then into a microcomputer 34.

The microcomputer 34 also receives output signals from a temperature setter 37 for regulating the setting temperature $T_D$ in the passenger compartment, a console panel 38 for manually setting the discharge mode, discharge capacity, operation of the refrigeration cycle, and operation of the auto-control mode, and a manual air-distribution setter 39 for manually setting the left-to-right air distribution ratio.

The temperature setter 37 is composed of up and down switches 44a, 44b and an indicator or display 44c for indicating the setting temperature. By operating the up and down switches 44a, 44b, the setting temperature shown on the display 44c can be adjusted within a predetermined range.

The console panel 38 is equipped with mode switches 45a, 45b, 45c, 45d for manually setting the discharge mode into a vent mode (by 45a), a bi-level mode (by 45b), a heat mode (by 45c) and a defrost mode (by 45d), respectively, an air-conditioner (A/C) switch 46 for operating the refrigeration cycle, fan switches 47a, 47b, 47c for selecting the rotational speed of the blower 7 between a low speed FAN1 (47a), an intermediate speed FAN2 (47b) and a high speed FAN3 (47c), an automatic (AUTO) switch 48 for operating all the components of the air-conditioner in the automatic mode, and an off (OFF) switch 49 for stopping operation of the air-conditioner.

Figure 1A:
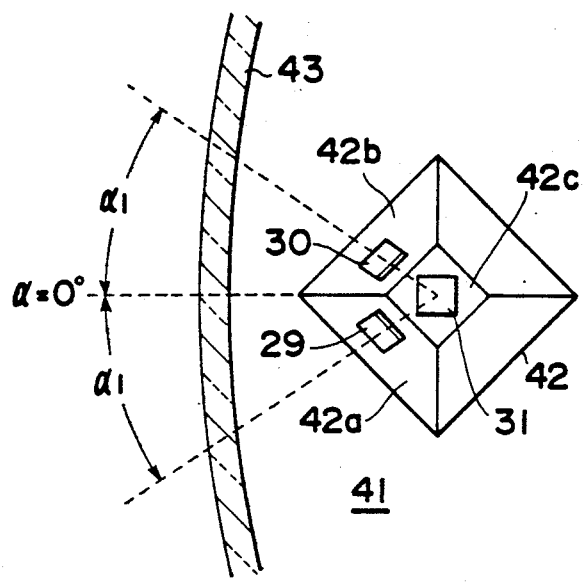
FIG. 1(a) is a plan view of a solar radiation detecting device according to the present invention.
Figure 1B:
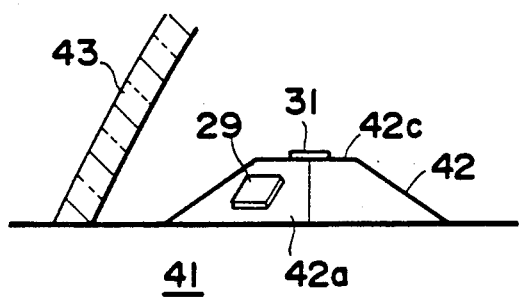
FIG. 1(b) is a side view of the solar radiation detecting device.

The first to third solar radiation sensors 29-31 are disposed on surfaces of a base 42 which is mounted on an instrument panel 41 and located substantially at the center of the width of the automobile. The mounting structure of the solar radiation sensors 29-31 will be described in greater detail with reference to FIGS. 1(a) and 1(b).

Figure 3:
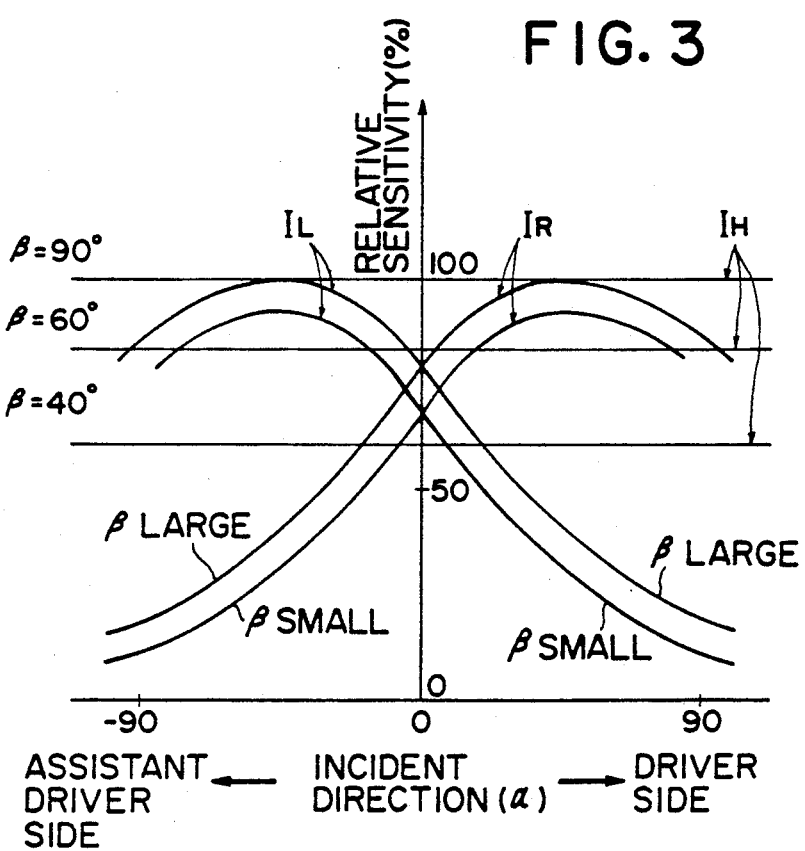
FIG. 3 is a graph showing output characteristic curves of respective solar radiation sensors of the solar radiation detecting device.

The base 42 is in the shape of a truncated quadrilateral pyramid having two opposite side edges facing widthwise of the automobile and two opposite side edges facing lengthwise of the automobile. The first and second solar radiation sensors 29, 30 are disposed on two oblique sides 42a, 42b of the base 42 facing to the windshield 43 of the automobile, while the third solar radiation sensor 31 is disposed on a top end wall 42c of the truncated quadrilateral pyramidal base 42. The first solar radiation sensor 29 disposed on the left oblique side 42a and the second solar radiation sensor 30 disposed on the right oblique side 42t have their respective sensing surfaces extending obliquely both in a vertical direction and a horizontal direction relative to an imaginary vertical plane extending in a direction of travel ($\alpha=0$) of the automobile. With this arrangement, outputs $I_L$, $I_R$ of the first and second solar radiation sensors 29, 30 are maximum when the position of the sun inclines leftward and rightward relative to the direction of travel ($\alpha=0$) of the automobile by a predetermined angle $\alpha_1$ (for instance, $\alpha_1=45°$), as shown in FIG. 3. The third solar radiation sensor 31 disposed on the top end wall 42c has a substantially horizontal sensing surface and hence the output $I_H$ from the third solar radiation sensor 31 is substantially constant (horizontal solar radiation quantity) irrespective of the direction of solar radiation, as shown in FIG. 3. The outputs from the respective solar radiation sensors 29-31 depend on the altitude of the sun.

The microcomputer 34 is of the construction known per se and includes a central processing unit (CPU), a read only memory (ROM), a random access memory (RAM), an input/output port (I/O), etc. Based on the input signals stated above, the microcomputer 34 produces output signals and sends them through driver circuits 40a-40f to the actuators 6, 10a, 17, 23, 26 and a motor of the blower 7 to control operation of the doors 5, 10, 14, 15, 16, 24 and of the grille 25 and rotation of the blower 7.

Figure 5:
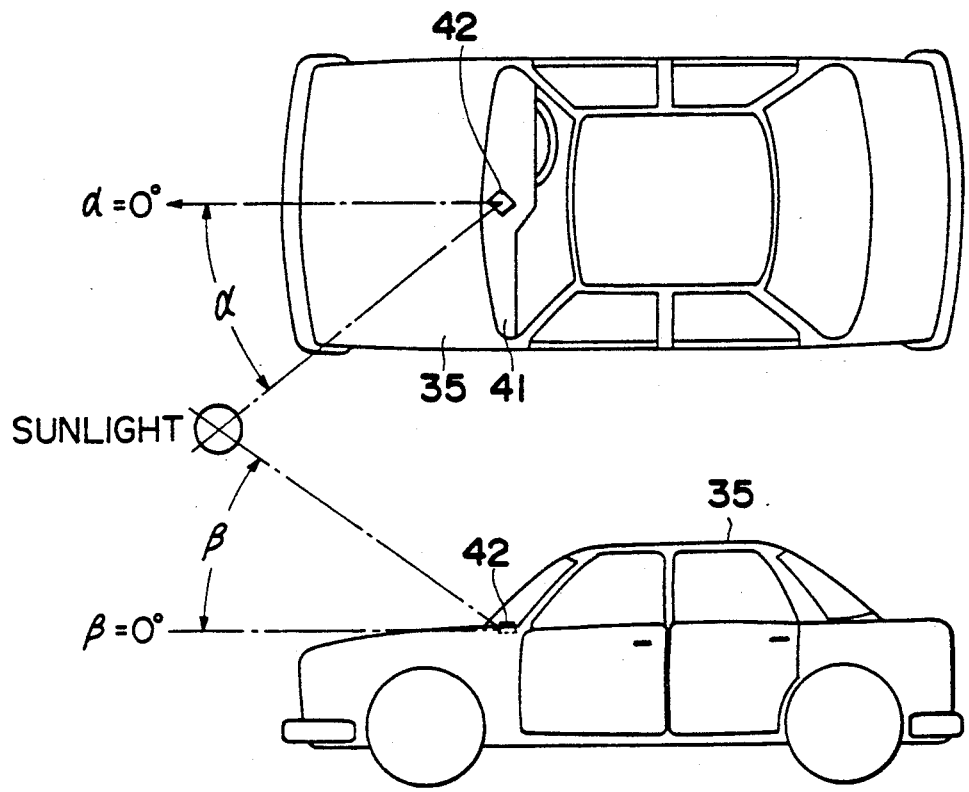
FIG. 5 is an explanatory view showing the incident direction and the incident altitude of the sunlight.

Operation of the microcomputer 34 will be described below with reference to a flowchart shown in FIG. 4. The flowchart illustrates a routine achieved for controlling operation of the air-conditioner depending on solar radiating conditions. A step 50 starts the control routine of the microcomputer 34 and in the next following step 52, output signals $I_L$, $I_R$, $I_H$ from the respective solar radiation sensors 29, 30, 31 for proceeding necessary steps to calculate an incident direction $\alpha$, incident altitude $\beta$ and incident intensity $I_O$. The term "incident direction $\alpha$" used herein is intended to refer to an angle of deviation of the sun relative to the direction of travel of the automobile, as shown in FIG. 5. The deviation of the sun in the direction toward the driver is referred to as a positive (+) deviation, while the deviation of the sun in the direction toward the assistant driver is referred to as a negative (−) deviation. The term "incident altitude $\beta$" used herein is intended to refer to an angle of deviation of the sun relative to the horizontal ($\beta=0$).

The incident direction $\alpha$ is calculated in a manner described below. A step 54 compares the output $I_L$ from the first solar radiation sensor 29 with the output $I_R$ from the second solar radiation sensor 30. If $I_R \geq I_L$, the control advances to a step 56 to calculate an incident direction signal $SD_R$ using an expression (1). Conversely, if $I_R < I_L$, the control goes on to a step 58 to calculate the incident direction signal $SD_L$ using an expression (2).

$$SD_R = \frac{I_R - I_L}{I_R} \quad (1)$$

$$SD_L = \frac{I_L - I_R}{I_L} \quad (2)$$

Figure 6:
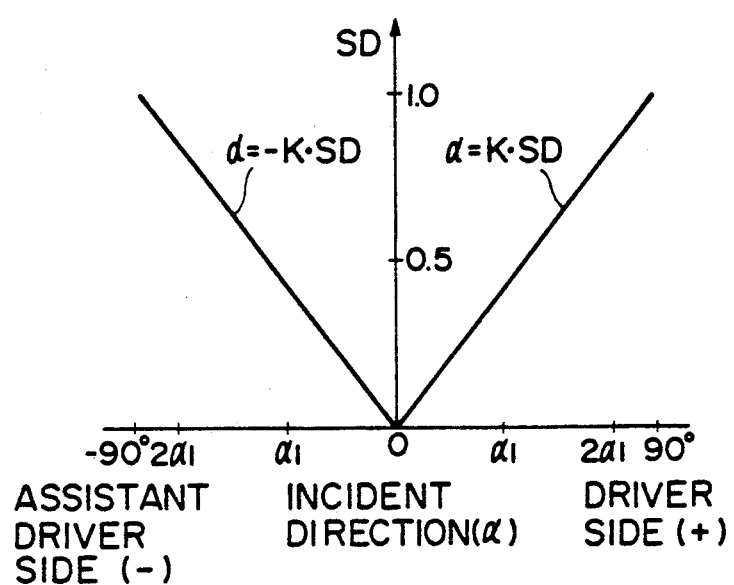
FIG. 6 is a graphical illustration of a characteristic curve showing the relationship between the incident direction α and the incident direction detecting signal SD.

The incident direction signals $SD_R$, $SD_L$ thus calculated are then used in calculation of the incident direction As shown in FIG. 6, if $I_R \geq I_L$, a positive angle of deviation toward the driver's side is calculated by using an expression (3). If $I_R < I_L$, a negative angle of deviation toward the assistant driver's side is calculated by using an expression (4).

$$\alpha = K \cdot SR_R \quad (3)$$

$$\alpha = -K \cdot SD_1 \quad (4)$$

where K is a constant.

The incident altitude $\beta$ is calculated in a manner described below. A step 64 judge to determine as to whether the incident direction $\alpha$ obtained by the preceding steps 54-62 is in a predetermined range ($0 \leq \alpha \leq 2\alpha_1$) on the driver's side. If no, the control goes on to a step 66 and a further judgment is made to determine as to whether the incident direction $\alpha$ obtained by the preceding steps; 54-62 is in a predetermined range ($-2\alpha_1 \leq \alpha < 0$) on the assistant driver's side. If $O \leq \alpha \leq 2\alpha_1$ in the step 64, the control advances to a step 68 to obtain an incident altitude detection signal SH by using an expression (5). If $-2\alpha_1 \leq \alpha < O$ in the step 66, the control advances to a step 70 to obtain the incident altitude detection signal SH according to an expression (6). Thereafter, a step 72 calculate an incident altitude $\beta$ according to an expression (7).

$$SH = \frac{I_H - I_R}{I_H} \quad (5)$$

$$SH = \frac{I_H - I_L}{I_H} \quad (6)$$

$$\beta = K_\beta \cdot SH + \beta_0 \quad (7)$$

where $K_\beta$ is a proportional constant and $\beta_0$ is a correction term.

Figure 7:
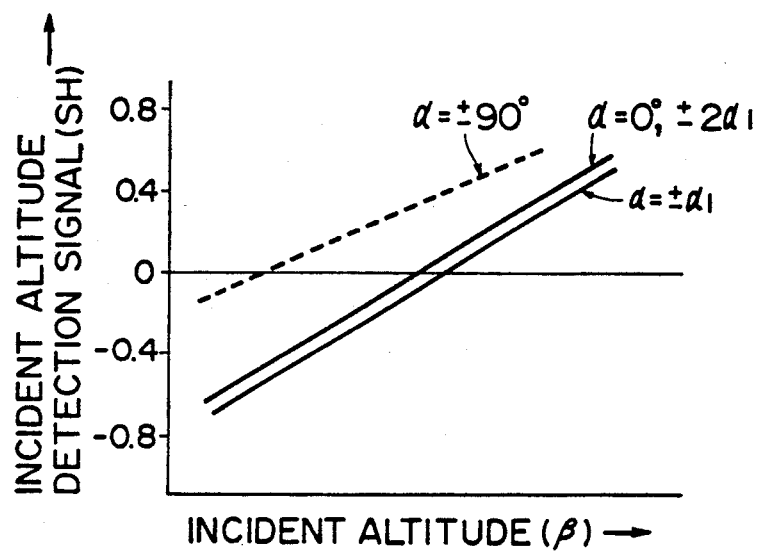
FIG. 7 is a graph showing characteristic curves indicating the relationship between the incident altitude β and the incident altitude detection signal SH.

In calculating the incident altitude $\beta$, the incident direction is limited to the certain range. This is because the quantity of incident solar radiation decreases when the incident direction deviated largely in the widthwise direction of the automobile and hence such largely deviated incident direction is negligible in terms of control. As shown in FIG. 7, if $-2\alpha_1 \geq \alpha \geq 2\alpha_1$, the incident altitude $\beta$ is substantially constant irrespective of whether the incident direction $\alpha$ is positive or negative, as indicated by the solid lines. However, when $\alpha$ is nearly equal to $\pm 90°$, errors in $\beta$ become greater as indicated by the dotted lines. Accordingly, when $\alpha$ is not in the range of $-2\alpha_1 \geq \alpha \geq 2=1$, the calculation of an incident altitude $\beta$ is not performed and the incident altitude obtained in the preceding cycle of the control routine.

The incident altitude $\beta$ is thus obtained. Subsequently, the control advances to a step 74 to calculate an incident intensity $I_O$ according to a known practice. Since the third solar radiation sensor 31 is kept substantially horizontal, the output $I_H$ from this solar radiation sensor 31 is indicated by $I_H = I_O \sin\beta$. Based on the incident altitude β obtained in the preceding step 72, the incident intensity $I_O$ is obtained by using an express on (8).

$$I_0 = \frac{I_H}{\sin \beta} \quad (8)$$

Thus, the mounting structure of the first to third solar radiation sensors 29-31 ensures that the incident direction α can be detected properly by using the first and second solar radiation sensors 29, 30, while the incident altitude and the incident intensity can be detected properly by using the third solar radiation sensor 31 and one of the first and second solar radiation sensors 29, 30.

After all factors of solar radiating conditions have been calculated, the control advances to a step 76 and then to a step 78 to control distribution of discharged air both in a horizontal direction and a vertical direction.

Figure 8:
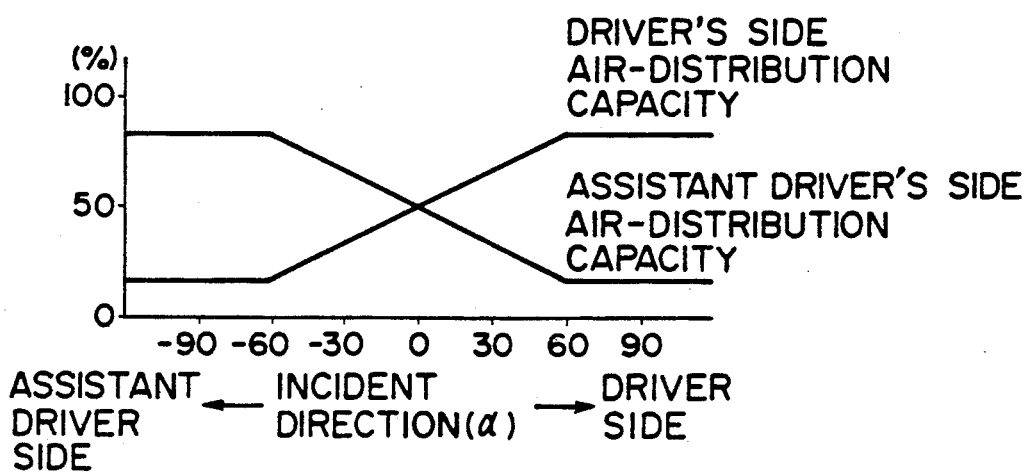
FIG. 8 is a graphical representation of characteristic curves showing the operation of an air-distribution door.
Figure 9:
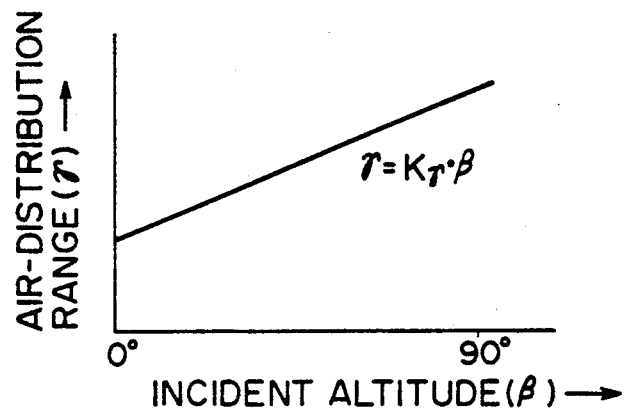
FIG. 9 is a graph showing a incident altitude (β)-to-air-distribution range (Γ) characteristic curve.

The step 76 actuates the air-distribution door 24 depending on the incident direction α so as to trace a predetermined characteristic pattern shown in FIG. 8. The step 78 controls the movement of the grille 25 to vary the range Γ of vertical distribution of discharged air in proportion to the incident altitude β, as shown in FIG. 9. (64 =$K_\Gamma \cdot \beta$, where $K_\Gamma$ is a proportional constant.)

Figure 10:
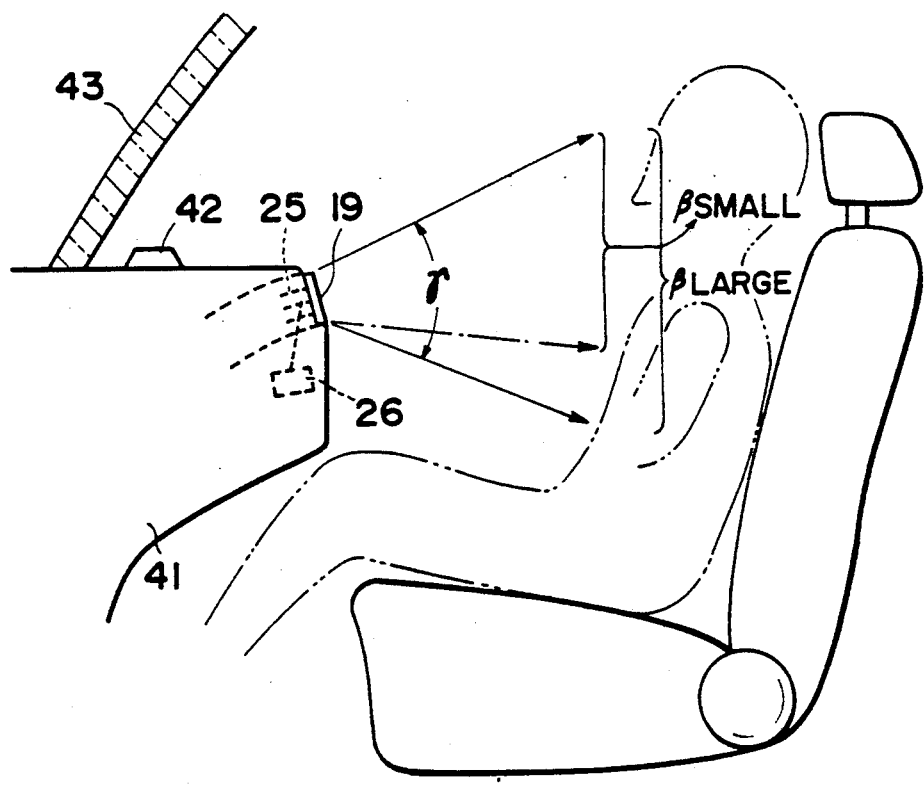
FIG. 10 is a diagrammatical view showing a variable range of distribution of discharged air.

With this control of horizontal and vertical air distribution, the amount of air distributed to a sunlit side is increased. Furthermore, as shown in FIG. 10, when the incident altitude β is relatively small (β SMALL), the range Γ of vertical air distribution is narrowed to direct the controlled air to a head portion of an occupant which is lighted by the sun. When the incident altitude β is relatively large (β LARGE), a lower portion of the occupant's body is also lighted by the sun. In this instance, the range Γ of vertical distribution is enlarged downwardly so as to direct the controlled air onto all the sunlit portion of the occupant.

Obviously, various minor changes and modifications of the present invention are possible in the light of the above teaching. It is therefore to be understood that within the scope of the appended claims the invention may be practiced otherwise than as specifically described.

What is claimed is:

1. A solar radiation detecting device for an automobile air-conditioner, comprising:
   first and second solar radiation sensors adapted to be disposed in the passenger compartment of an automobile and having respective sensing surfaces receiving sunlight coming into the passenger compartment, said sensing surfaces extending obliquely both in a vertical direction and a horizontal direction relatively to an imaginary vertical plane extending in a direction of travel of an automobile; and
   a third solar radiation sensor adapted to be disposed in the passenger compartment and having a sensing surface receiving the sunlight coming into the passenger compartment, said sensing surface of said third solar radiation sensor extending substantially horizontally.

2. A solar radiation detecting device according to claim 1 wherein said first and second solar radiation sensors detect quantities of solar radiation coming from left and right sides, respectively, of the automobile and each produce a maximum output when a direction of the incident sunlight is aligned with a predetermined direction.

3. An air-conditioner for an automobile, comprising:
   an air-distribution adjusting mechanism disposed in a vent outlet of the automobile air-conditioner for adjustably varying a vertical distribution of discharged air blown off from said vent outlet into a passenger compartment of the automobile;
   a solar radiation detecting device including first and second solar radiation sensors disposed in the passenger compartment and having respective sensing surfaces for receiving sunlight coming into the passenger compartment, said sensing surfaces extending obliquely both in a vertical direction and a horizontal direction relatively to an imaginary vertical plane extending in a direction of travel of an automobile, and a third solar radiation sensor disposed in the passenger compartment and having a sensing surface receiving the sunlight coming into the passenger compartment, said sensing surface of said third solar radiation sensor extending substantially horizontally;
   incident direction calculating means for calculating an incident direction of the sunlight based on outputs from said first and second solar radiation sensors;
   incident altitude calculating means for calculating an incident altitude of the sunlight based on an output from said third solar radiation sensor and an output from one of said first and second solar radiation sensors when said incident direction calculated by said incident direction calculating means is in a predetermined range; and
   drive control means for controlling operation of said air-distribution adjustment mechanism depending on the magnitude of said incident altitude calculated by said incident altitude calculating means.

4. An air-conditioner according to claim 3 wherein said air-distribution adjustment mechanism includes a grille movably disposed in said vent outlet, and a motor actuator for driving said grille.

5. An air-conditioner according to claim 3 wherein said incident direction is equal to a larger one of a left side solar radiation quantity and a right side solar radiation quantity divided by said larger solar radiation quantity times a correction constant.

6. An air-conditioner according to claim 3 wherein said incident altitude is equal to a horizontal solar radiation quantity minus one of a left side solar radiation quantity and a right side solar radiation quantity divided by the horizontal solar radiation quantity multiplied by a correction constant.

* * * * *